No. 851,956. PATENTED APR. 30, 1907.
M. F. McMAHON.
FRICTION CLUTCH FOR AUTOMOBILES AND OTHER PURPOSES.
APPLICATION FILED MAY 4, 1906.
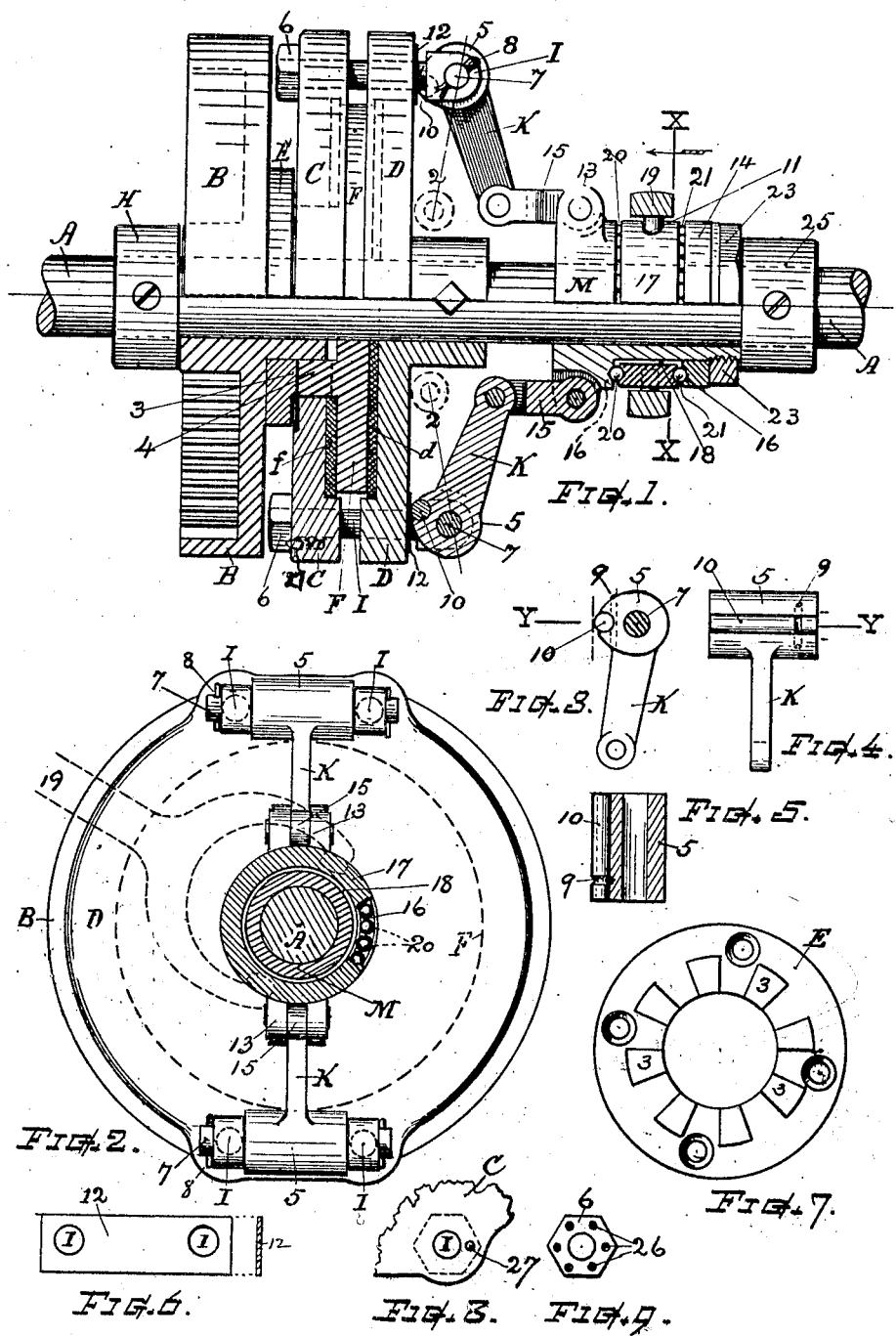

UNITED STATES PATENT OFFICE.

MICHAEL F. McMAHON, OF WORCESTER, MASSACHUSETTS.

FRICTION-CLUTCH FOR AUTOMOBILES AND OTHER PURPOSES.

No. 851,956.　　Specification of Letters Patent.　　Patented April 30, 1907.

Application filed May 4, 1906. Serial No. 315,134.

*To all whom it may concern:*

Be it known that I, MICHAEL F. McMAHON, a citizen of the United States, residing at Worcester, in the county of Worcester and State of Massachusetts, have invented new and useful Improvements in Friction-Clutches for Automobiles and other Purposes, of which the following is a specification, reference being made therein to the accompanying drawings.

The object of my present invention is to provide a clutch more especially adapted for use in connection with the driving mechanism of automobiles, or with other high speed machinery; and in which the clutch-operating mechanism will not be affected, or liable to disturbance of its adjustment so as to accidentally throw out or in, by the centrifugal or other forces developed by reason of any high speed attained. Also, to afford a mechanism which will run with little friction and wear, and by which the clutch can be operated with ease. These objects I attain by the mechanism illustrated in the drawings; the particular subject matter claimed being hereinafter definitely specified.

In the accompanying drawings, Figure 1 represents a half side, half sectional view of a clutch mechanism embodying my invention. Fig. 2 is a section, at line X X on Fig. 1, looking toward the head of the clutch. Figs. 3 and 4 represent side and front views, and Fig. 5 a section, at line Y Y, of one of the clamp-actuating levers, separately. Fig. 6 shows the detail of the lever-seat bearing-plate. Fig. 7 is a face view of the detachable coupling-piece whereby the clutch may be connected with the operating-wheel or gear of an automobile-driving mechanism; or to any mechanism wherein the clutch is embodied. Fig. 8 is a fragmentary view of a portion of the clutch-disk provided with means for holding the clamp-adjusting nut, and Fig. 9 shows the inner face of one of the clamp-adjusting nuts.

Referring to the drawings, A indicates the shaft or axle. B the wheel, which in the present illustration is the power member, and which may be a sprocket, pulley, sheave or gear of an automobile-driving or other mechanism. Said wheel or gear is mounted to turn loose on the shaft or axle, and may be operated in any suitable or well known manner.

C and D indicate the clamping-disks, and F the central or friction disk of the clutch, disposed between the clamp-disks; and $f$ and $d$ frictional face-packings, of vulcanized fiber or other suitable material, arranged between the disk-faces at each side thereof in well known manner.

E indicates a coupling-plate or member provided with means, as screw holes and screws, for its attachment to the driving wheel B, and also provided with a series of laterally projecting cogs or teeth 3 which intermesh with a series of cogs or teeth 4 formed upon and projecting from the friction-disk F.

The disk D of the clutch is secured or fixed on the axle or shaft so as to operate therewith; and the two disks C and D are connected by the draft-bolts I, which are arranged in opposite pairs with their head ends respectively connected to the heads 5 of the levers K, at the outer side of the disk D; and have adjusting-nuts 6 threaded upon their opposite ends, at the outer side of the disk C, by means of which the degree of movement or tension for clamping the friction members may be accurately adjusted.

H indicates a collar or hub secured to the shaft A adjacent to the wheel B, and which keeps the wheel at position against the clutch-mechanism and prevents separation of the coupling members 3 and 4, except when it is desired to take the mechanism apart for inspection, or any purpose that requires its disassembling.

As a feature of my invention, the clamp-actuating arms or levers K are each made with a broad pivoting head 5 of suitable dimension to occupy the space between the pair of draft-bolts I, and said lever-head is pivotally connected to the heads of the two bolts by a pin or axle 7 that passes transversely through the parts. The pin 7, as shown, is retained by cotter-pins 8 inserted through its ends. The arm of the lever K extends inward from the head toward the shaft A and swings in a plane radial with the axis thereof. The lever head 5 is generally cylindrical with a protuberance or nose on the side adjacent to the clutch-disk; and is there provided with a rotatable fulcrum-bearing roller 10 supported within a bore extending along the side or nose of the lever head, parallel with the pivot-axis 7, as indicated particularly in Figs. 3, 4 and 5. The roller 10 is confined within the lever head with a portion of its cylindrical face projecting therefrom, which portion rolls against the surface of the disk D, or a bearing-plate 12 of hard steel which is arranged on the face of the disk, as indicated, serving as a fulcrum seat for receiving the pressure of the clamp lever action. The heads of the pair of draft-bolts I fit against the ends of the lever-head 5 and its roller 10, and serve to support the lever and its axis pin 7, and to confine the lever-head, together with the roller, in proper relation laterally, without requiring lugs or projections to be formed upon the disk D therefor.

The fulcrum bearing roller 10 is best provided with means to prevent its escape endwise from the lever head, in case the lever is taken out. Such means may consist of a groove cut in the roller and a small pin 9 inserted in the lever head and engaging such groove. (See Figs. 3, 4 and 5.)

Each of the lamp-adjusting nuts 6 are provided on their inner faces with a series of conical recesses 26 which engage with an automatically retractable spring-pressed conically pointed stud 27 fitted in a cavity in the clutch-disk C and inclosed beneath the nut, as shown in Figs. 8 and 9. The stud engages automatically with any one of the recesses 26 and prevents the nut from becoming self-displaced, but permits of its being readily turned with a wrench when desired, to afford such adjustment of the draft or clutching tension. When in clutched relation, the rollers are carried just past the dead center lines, so that the position is self-sustaining and will not accidentally release itself.

The clutch-operating slide M consists of a sleeve or tubular hub having ears 13 that are connected by pivoted links 15 with the inner ends of the levers; said links being disposed approximately parallel with the axis-shaft. Surrounding said hub or slide I provide a circular collar 14 and an oppositely disposed shoulder, each having an annular rollway 16 thereon, and between the same I arrange a loose member or ring 17 having rollways upon its edges, and I support the same by series of bearing-balls disposed between the parts, as at 20 and 21. The ring 17 is supported wholly by the balls and without contact of its inner surface with the sleeve; a space 18 of about one sixteenth of an inch, more or less, being arranged between the inner face of the ring and the outer face of the sleeve, so that it runs perfectly free. Said ring is provided with means, as openings or lugs 11, for connecting thereto the shipper or operating fork 19. The rollway collar 14 is confined upon the slide by a suitable nut 23 screwed onto the threaded end of the sleeve, or in other efficient manner. A stop, or guard-collar, 25 is secured upon the axle at the outer end of the slide for arresting its motion at the proper position.

In the operation: When the slide M is moved forward toward the clutch-disk D so as to carry the ends of the levers K to the position indicated by dotted lines 2 on Fig. 1, the bearing rollers 10 act against the disk D, or face of the plates 12, thereby drawing the disks C and D toward each other and firmly clamping the friction disk F between them, so that all the parts will rotate together, transmitting the power from the wheel B to the shaft or axle A, or vice versa. The roller 10 insures free movement of the fulcrum bearing against the face of the disk, or its seat-plate, causing the levers to act without sticking or undue friction; thus enabling the clutch to be closed and opened by the movement of the slide and shipper fork with the greatest ease and smoothness of action. Furthermore, by the arrangement of levers as shown, when the clutch is at either closed or opened position, centrifugal force, at any degree of speed, has no effect toward throwing the levers outward so as to release the clutch or to engage it while the parts are revolving.

The ring 17, which is held by the clutch-operating fork, by reason of its ball-bearings and its non-contact with the slide-sleeve, permits free action of the parts without tendency to heating or excessive wear; since the levers K,—by reason of their rollers 10 passing the dead-center line,—are self-retaining and hold the sleeve at its in-clutch position without requiring any side strain or pressure against the sleeve. In like manner the ring 19 is sustained without side pressure when the sleeve is at out-clutch position, by reason of the slide being stopped against the collar 25.

Clamping-disks and a friction-disk somewhat similar to those herein shown have been illustrated and described in my prior Letters Patent No. 712,575, and I do not therefore make claim herein broadly to the feature of such disks, or the creation of friction by the closing together of the disks; nor to the operation of a clutch by means of toggle-levers; irrespective of their construction.

What I claim and desire to secure by Letters Patent, is—

1. In combination, as described, with the two clamping-disks, intervening frictional-disk, draft-bolts arranged in pairs and shipper-slide-collar; the radially disposed inwardly extending clamp-actuating levers having broad heads each pivotally connected with the heads of a pair of draft-bolts by an axis-pin passing through the same, each lever provided with a fulcrum bearing roller in and extending across the face of its head, adjacent to the side of the clamping-disk, and adapted to throw past the dead-center line, when operating the clutch; the heads of the pair of draft-bolts fitting against the respective ends of the roller and lever-head and supporting the same, substantially as shown.

2. The combination, substantially as described, with the axis-shaft, the frictional-disk loose on said shaft, the power-wheel, the toothed coupling-plate connecting said disk and power-wheel, a pair of clamping-disks that embrace said frictional-disk, and draft-bolts arranged in pairs therethrough; of the radially disposed clamp-actuating levers each having a protuberant T-head extending between the heads of a pair of draft-bolts, a pivot-pin through the draft-bolt-heads and lever-head, said lever-heads having a protuberant face provided with a bore parallel with the pivot-axis, a roller disposed in said bore with a portion of its cylindrical body protruding therefrom as a fulcrum support, means for preventing the escape of said roller, the fulcrum-bearing-plates each mounted on two draft-bolts adjacent to said roller, a clutch-operating slide, and links connecting said slide with the inner ends of said clamp-actuating levers.

3. In a clutch actuating mechanism, the shipper-slide comprising the tubular body having the pivoting ears and extended sleeve portion provided with annular collar members or shoulders having rollway surfaces, a loose shipper-connecting ring surrounding said sleeve and provided with opposite rollway surfaces, bearing-balls disposed between the rollways on said ring and the rollways of said shoulders, and a nut threaded to the outer end of said sleeve for confining the collar members.

4. In combination with the clutch-disks and clutch-operating devices, comprising the toggle lever; of the slide or shifting-collar provided with annular rollways, and a fork-connecting ring having annular grooved edges, said ring being revolubly supported by ball-bearings between said rollways, and having a space between its inner surface and the exterior surface of the slide.

5. The combination, of the clutch-disks, intervening frictional disk, clamp-bolts arranged in pairs connecting the clutch-disks, and clamp-actuating levers for operating said pairs of bolts, the clamp-adjusting nuts threaded upon said bolts and seated against the back of the clutch-disk opposite the lever; and an automatically retractable retaining device inclosed and concealed beneath each of the nuts, and automatically engageable therewith at positions corresponding with the angles of the nut, whereby adjustment for regulating the pair of clamp-bolts can be effected to a uniform degree for the several bolts, by simple application of a wrench to the respective nuts, substantially as set forth.

Witness my hand this 1st day of May 1906.

MICHAEL F. McMAHON.

Witnesses:
CHAS. H. BURLEIGH,
ELLA P. BLENUS.